(12) United States Patent
Drazic et al.

(10) Patent No.: US 7,300,158 B2
(45) Date of Patent: Nov. 27, 2007

(54) PROJECTION DISPLAY APPARATUS

(75) Inventors: Valter Drazic, Betton (FR); Eugene O'Donnell, Fishers, IN (US); Pascal Benoit, Liffre (FR); Arno Schubert, Chevaigne (FR)

(73) Assignee: Thomsom Licensing, Boulonge-Billancourt (FR)

( * ) Notice: Subject to any disclaimer, the term of this patent is extended or adjusted under 35 U.S.C. 154(b) by 22 days.

(21) Appl. No.: 10/893,026

(22) Filed: Jul. 16, 2004

(65) Prior Publication Data
US 2005/0012903 A1   Jan. 20, 2005

(30) Foreign Application Priority Data
Jul. 16, 2003   (EP)   ................................. 03291764
Oct. 10, 2003  (EP)   ................................. 03292524

(51) Int. Cl.
G03B 21/22   (2006.01)
G03B 21/14   (2006.01)
G03B 21/28   (2006.01)

(52) U.S. Cl. ............................. 353/75; 353/77; 353/78; 353/97; 353/99

(58) Field of Classification Search .................. 353/20, 353/84, 97, 98, 102, 121, 122, 30, 74–79, 353/88, 89, 99; 385/133, 146, 901; 359/227, 359/738
See application file for complete search history.

(56) References Cited

U.S. PATENT DOCUMENTS

| 4,765,733 | A | 8/1988 | Negishi ......................... 353/99 |
| 5,884,991 | A | 3/1999 | Levis et al. .................. 353/122 |
| 5,924,783 | A * | 7/1999 | Jones ........................... 353/97 |
| 6,017,123 | A | 1/2000 | Bleha et al. ................... 353/30 |
| 6,272,269 | B1 * | 8/2001 | Naum ............................ 385/43 |
| 6,324,330 | B1 * | 11/2001 | Stites ......................... 385/133 |
| 6,517,210 | B2 * | 2/2003 | Peterson et al. ............. 353/98 |
| 6,715,880 | B2 * | 4/2004 | Shouji ........................... 353/20 |
| 6,739,723 | B1 * | 5/2004 | Haven et al. .................. 353/20 |
| 2002/0114167 | A1 | 8/2002 | Schmidt et al. ............. 362/551 |
| 2004/0233679 | A1 * | 11/2004 | Ferri et al. .................. 362/551 |
| 2006/0001973 | A1 * | 1/2006 | Peterson et al. ............ 359/618 |
| 2006/0256295 | A1 * | 11/2006 | Lang et al. .................... 353/37 |

* cited by examiner

*Primary Examiner*—Melissa Jan Koval
(74) *Attorney, Agent, or Firm*—Joseph J. Laks; Harvey D. Fried; Patricia Varlengieri

(57) ABSTRACT

The invention concerns a display apparatus with an imager illuminated by an illumination system and with an imaging system projecting an image on a viewing screen, wherein the brightness of the image on the imager has a variation over a given direction, and wherein the illumination system has light controlling elements for controlling the light distribution over the given direction.

16 Claims, 5 Drawing Sheets

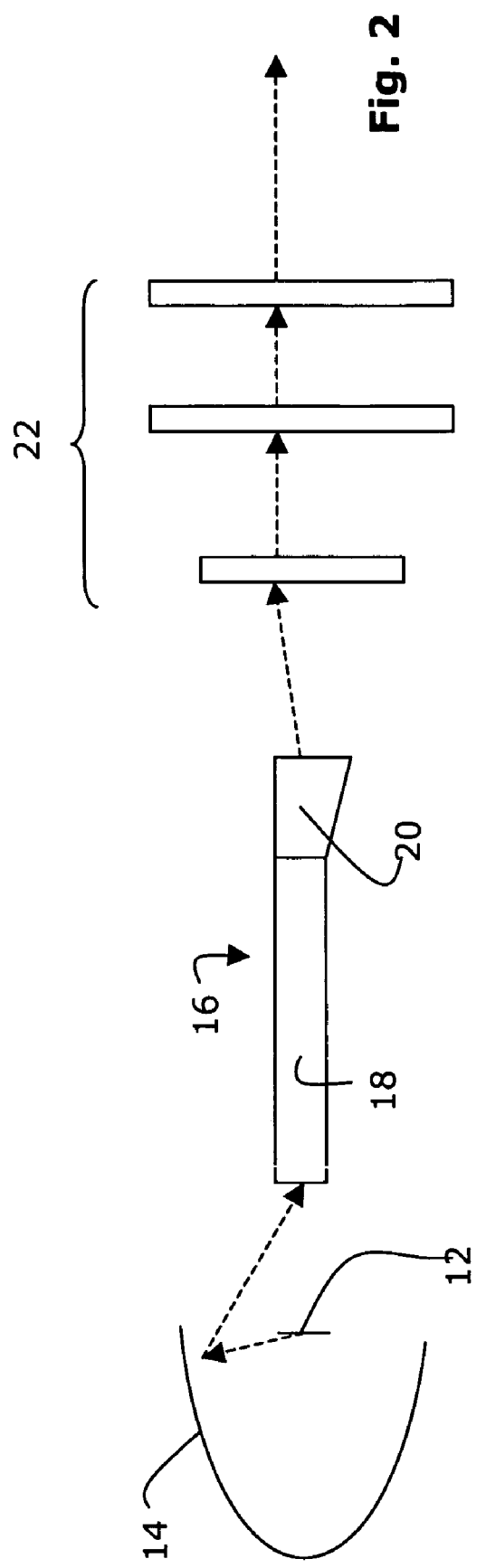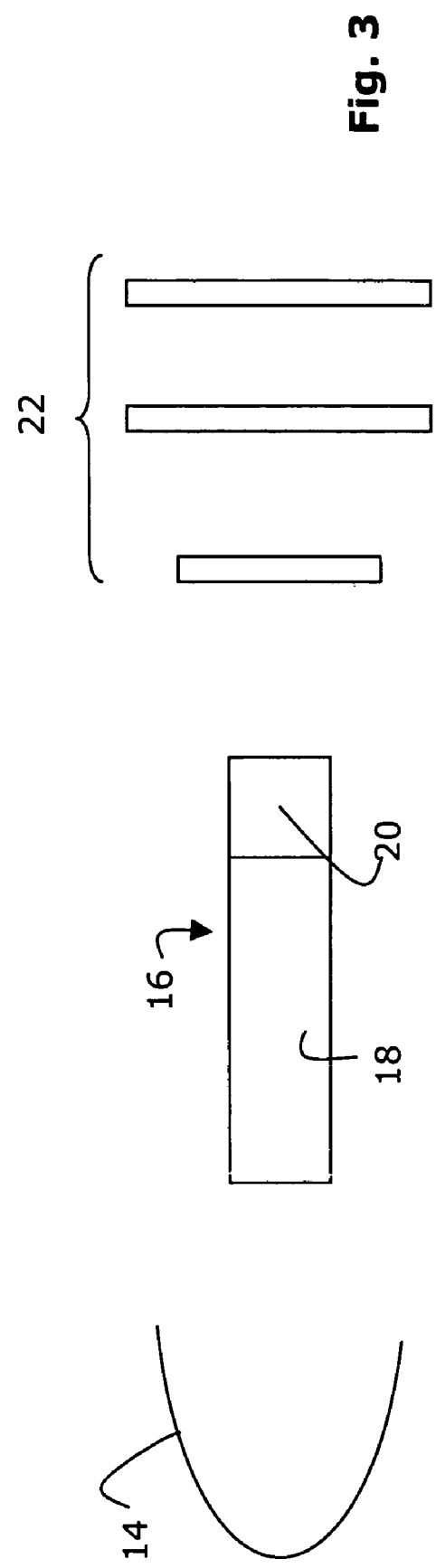

PROJECTION DISPLAY APPARATUS

FIELD OF THE INVENTION

The invention relates to a projection display apparatus.

BACKGROUND OF THE INVENTION

In a typical projection display apparatus, the picture produced by an imager illuminated by an illumination system is projected on a viewing screen thanks to an imaging system.

It is naturally desirable for the user that the apparatus has a depth perpendicular to the screen as small as possible (slim projector). However, as the illumination and imaging systems are preferably located at one side of the apparatus (generally the bottom side), the small depth necessarily implies that light is incoming onto the screen with an angle varying over a wide range.

As the transmission factor of the screen depends on the incoming angle of light, as in any optical system, this results in an uncontrolled heterogeneous brightness level over the screen (generally the bottom part is brighter).

SUMMARY OF THE INVENTION

The invention aims at a solution allowing designers to better control the distribution of light over the screen, for instance to obtain a more uniform brightness level, possibly together with a higher brightness level in the center.

The invention proposes a display apparatus with an imager illuminated by an illumination system and with an imaging system projecting the image on a viewing screen, wherein the optical efficiency from the imager to the viewing screen has a variation over a given direction and wherein the illumination system has means for controlling the light distribution over the given direction.

More precisely, the invention proposes a display apparatus with an imager illuminated by an illumination system and with an imaging system projecting an image on a viewing screen, wherein the brightness of the image on the imager has a variation over a given direction, and wherein the illumination system has means, for controlling the light distribution over the given direction.

Preferably, the given direction corresponds to the horizontal axis or the vertical axis of the image.

In an advantageous way, the controlling means at least compensate partially a variation of the brightness on the screen.

Generally, the controlling means generate a non-uniform, preferably asymmetrical, light distribution over the given direction. Practically, the controlling means comprises a light guide generating a non-uniform light distribution over the given direction. According to a possible embodiment, the light guide is asymmetrical relatively to an optical axis of the illumination system. For instance, the light guide has the shape of a hexahedron. Preferably, the light guide has a rectangular section. Preferably again, the light guide section is enlarging from the input to the output.

In order to improve the accuracy of the light distribution control, the light guide has an input face contacting another light guide. Preferably, the other light guide generates a substantially uniform light distribution over the input face.

In this possible construction, the light guide has at least a face inclined relatively to a corresponding face of said other light guide.

According to a convenient embodiment, the light guide has an output face, which is projected on the imager by a lens system.

According to another possible embodiment, the light guide has an output face carrying a gradient filter. For instance, the gradient filter is realized by a reflective gradient coating. It can notably generate an asymmetric distribution of light over the output face. Advantageously, the light guide has an input face carrying a reflective coating with a center hole.

In a further possible embodiment, the gradient filter is colored and can therefore compensate for color non-uniformities in the apparatus.

Preferably, the maximum projection angle of the image on the screen is greater than 50°.

BRIEF DESCRIPTION OF THE DRAWINGS

Other features of the invention will appear in light of the following description made with reference to the appended drawings, where:

FIGS. 2 and 3 represent an illumination system of the display apparatus of FIG. 1;

DETAILED DESCRIPTION OF THE INVENTION

Figure 1:
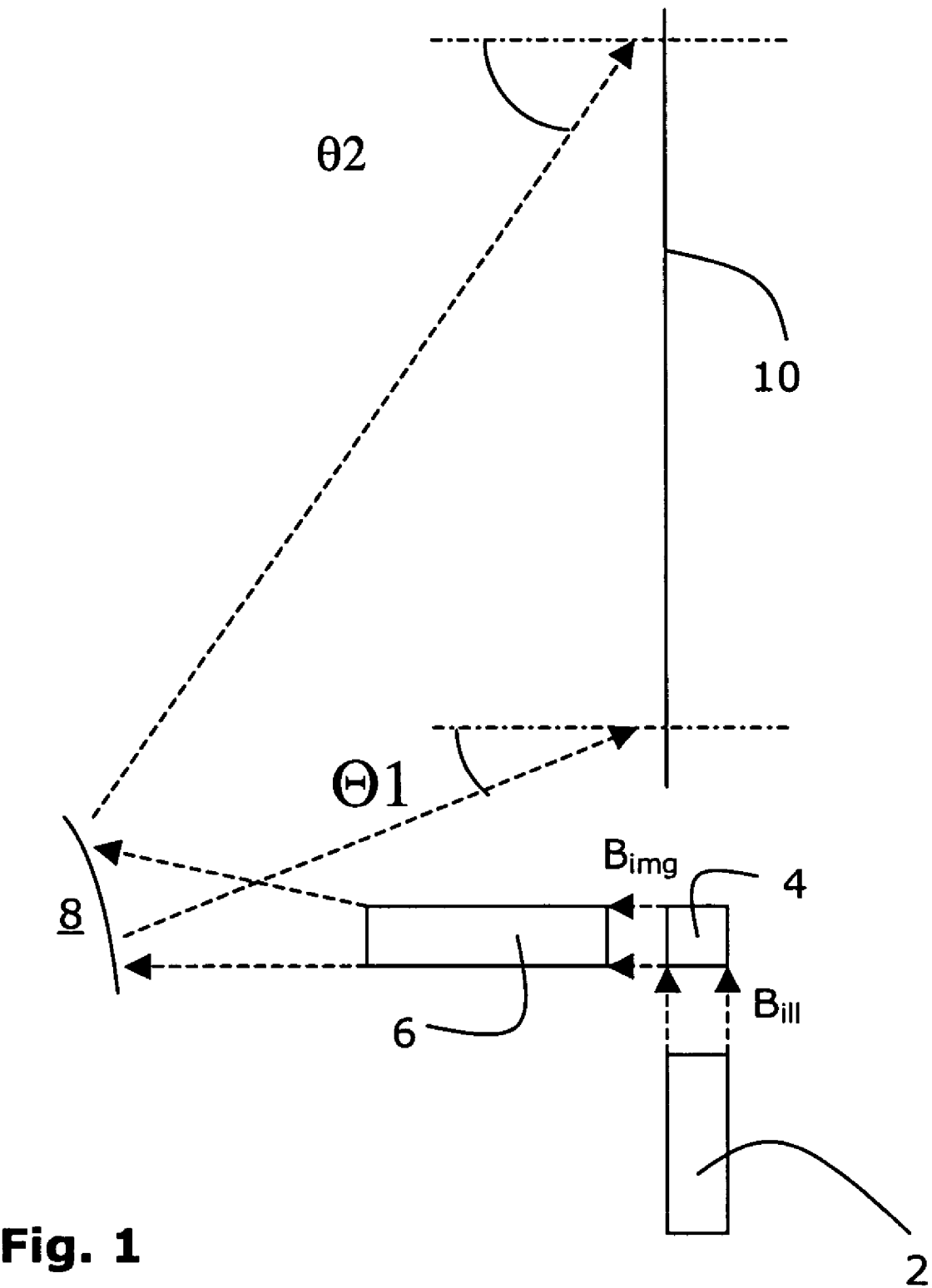
FIG. 1 represents a display apparatus.

The display apparatus schematically represented on FIG. 1 has an illumination system 2 generating a primary bundle of light $B_{ill}$ received by an imager 4.

The imager 4 determines which parts of the bundle of light $B_{ill}$ are to be transmitted to an imaging system, thereby creating a secondary bundle of light $B_{img}$ representative of a picture to be displayed.

The imager 4 is for instance arranged as a matrix of pixels. Each pixel has an effect on the incoming ray of light (part of the primary bundle $B_{ill}$) depending on how the corresponding pixel in the picture to be displayed should be lit.

The secondary bundle of light $B_{img}$ goes through a set of lenses 6 and is reflected by a reflector 8 onto the back of a viewing screen 10 in such a way that the set of lenses 6 and the reflector 8 define an imaging system, which projects the imager 4 on the viewing screen 10.

The viewing screen 10 carries transmissive elements (not represented), which generally collimate the incoming rays of light to a direction perpendicular to the viewing screen 10, but also focus the rays of light into micro-apertures of a black matrix of the viewing screen 10 with an angular extension corresponding to the field from which the display apparatus shall have a correct appearance.

As clear from FIG. 1, the rays of light incoming onto the viewing screen 10 (and hence onto its transmissive elements) have an incidence angle regarding the normal of the screen plane (or projection angle) varying over a great range, from $\Theta_1$ (about 30°) at the bottom to $\Theta_2$ about (about 60° or more) at the top. Generally, the maximum projection angle is greater than 50°.

The transmissivity of the viewing screen 10 is thus not constant over the whole screen but varies over the vertical direction. The efficiency of the transmission of light between the imager 4 and the viewing screen 10 thus suffers from a great variation along the vertical direction. For two points having the same brightness at the output of the imager (bundle $B_{img}$)—for instance a first point corresponding to the bottom of the picture to be displayed and a second point corresponding to the top, the brightness on the viewing screen 10 is unequal—the first point is much brighter than the second one.

In order both to compensate for this variation and to better control the distribution of light on the viewing screen 10, the illumination system 2 is provided with means (possibly optical elements) to control the distribution of light illuminating the imager 4. The light illuminating the imager can thus be distributed as desired by the designer, notably in a non-uniform way along the vertical direction to pre-compensate for the later variation in transmission efficiency described above.

FIG. 1 presents a rear projector according to the invention. Nevertheless, the invention concerns also front projectors, especially front projector dedicated to projection where the projection angle varies over a great range, from, for instance, about 30° to 60° (or more). Generally, the maximum value of the projection angle is greater than 50°. These front projectors comprise preferably an illumination system such as system 2 described above or hereafter.

A first possible embodiment of an illumination system 2 with light distribution controlling elements will now be described with reference to FIGS. 2 to 4.

The illumination system has a light source 12 located at the focus of a reflector 14, which concentrates the light on the input face of light tunnel 16. The light tunnel 16 comprises a first, symmetrical light guide 18 in the form of a parallelepiped (one face of which is the input face) along the general direction of light and a second, asymmetrical light guide 20, with an upper face flush with the upper face of the first light guide 18 and a lower face at an angle with the lower face of the first light guide 18. Precisely, the lower face of the second light guide 20 is diverging relatively to the general direction of light.

The first light guide 18 thus has a constant rectangular cross-section along the general direction of light, whereas the second light guide 20 has a rectangular cross section having an increasing dimension in the vertical direction along the general direction of light. The second light guide 20 has thus the shape of a hexahedron. Preferably, the section of the light guide is enlarging from the input to the output. The section of the light guide 20 is preferably rectangular, which is well adapted to a rectangular imager. According to a variant of the invention, the light guide 20 has another shape or its section is not rectangular (e.g., it is trapezoidal, for example, to compensate for a possible variation of the shape of illumination on the imager).

As visible from FIG. 3, in the described embodiment, each lateral face of the first light guide 18 is flush with the corresponding lateral face of the second light guide 20. As a possible variation, the lateral faces of the second light guide 20 could also form an angle with the general direction of light (and thus with the lateral faces of the first light guide 18) to also control the distribution of light laterally.

Due to the specific design of the second light guide 20, the light going out from the output face of the light tunnel 16 (the output face being a face of the second light guide 20) has a non-uniform, asymmetrical distribution in the vertical direction, as explained below in more detail with reference to FIG. 4, and is then projected onto the imager thanks to a lens system 22 having generally a plurality of lenses.

Figure 4:
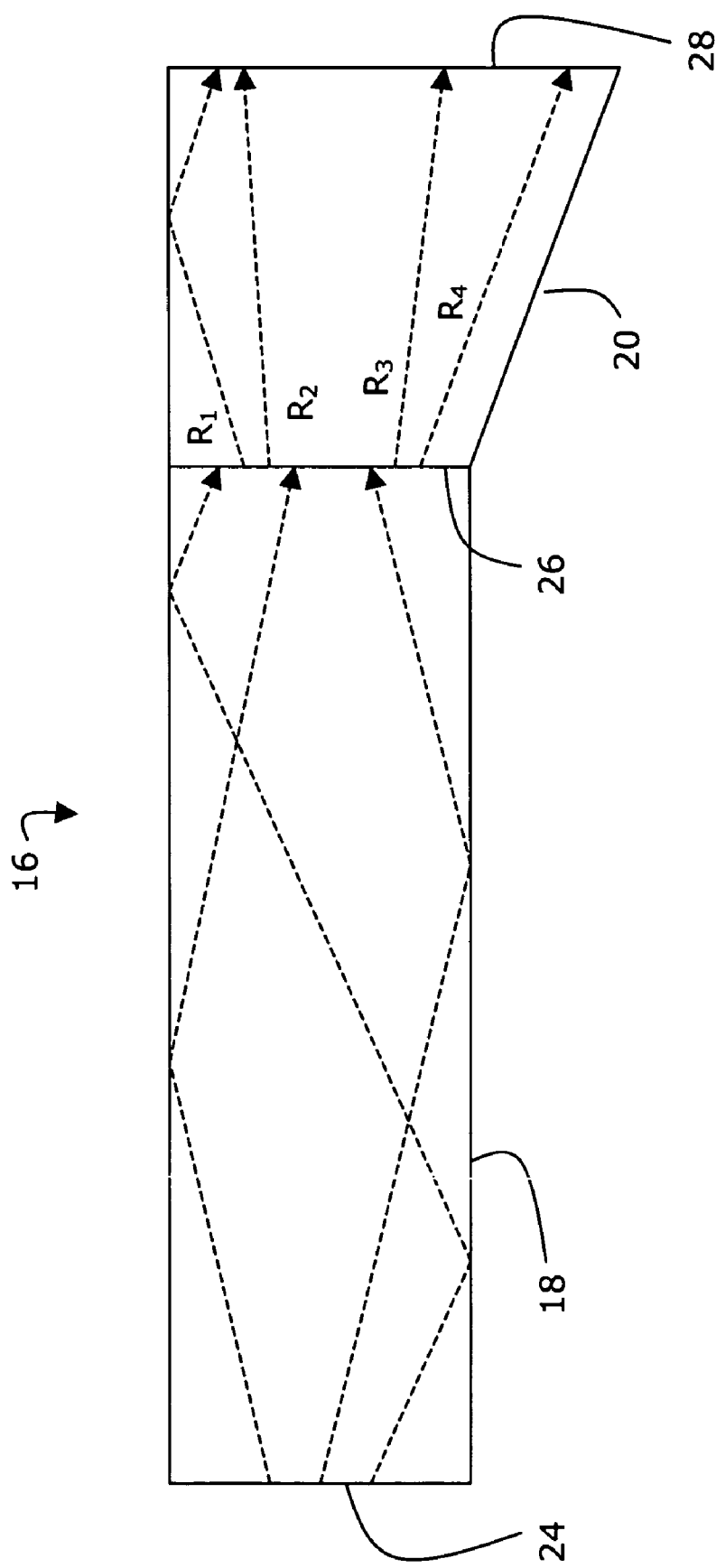
FIG. 4 represents a light tunnel of the illumination system of FIG. 2.

The first light guide 18 receives on its input face 24 a circular distribution of light from the reflector 14 and transforms it on its end face (which is the intermediate face 26 between the first light guide 18 and the second light guide 20) into a substantially uniform, rectangular distribution of light, notably through multiple reflections as represented on FIG. 4. Uniformity can be enhanced by increasing the length of the light guide.

The intermediate face 26 acts as a secondary source relatively to the second light guide 28. Rays of light $R_1$, $R_2$ in the upper region of the second light guide 20 behave approximately the same as in the first light guide 18, as the upper face of the second light guide 20 is flush with the upper face of the first light guide 18. In lower region however, due to the inclined lower face, some rays of light such (as ray $R_4$ on FIG. 4) are not reflected although they are at an angle relatively to the general direction of light so that some of the light flux at the bottom part is allowed to diverge (from ray $R_3$ for instance), resulting in a lower density of light at the bottom part.

As exemplified on FIG. 4, the distribution of light emitted from the output of the light tunnel 16 (corresponding to the output face 28 of the second light guide 20) is thus non-uniform and asymmetrical in the vertical direction.

The ratio between length and height of the output face 28 corresponds to the same ratio on the imager 4 as the output face 28 is projected onto the imager by lenses 22. Generally, it also corresponds to the aspect ratio of the display apparatus.

It can be pointed out that the use of two separate light guides for the light tunnel 16, although not compulsory, allows one to further improve control of the light distribution as the first light guide generates a uniform rectangular distribution, which is then converted in a more accurate way into the desired distribution by the second light guide.

Notably, the longer the hexahedron, the higher the degree of asymmetry and hence the stronger the centering of the brightness.

Figure 5:
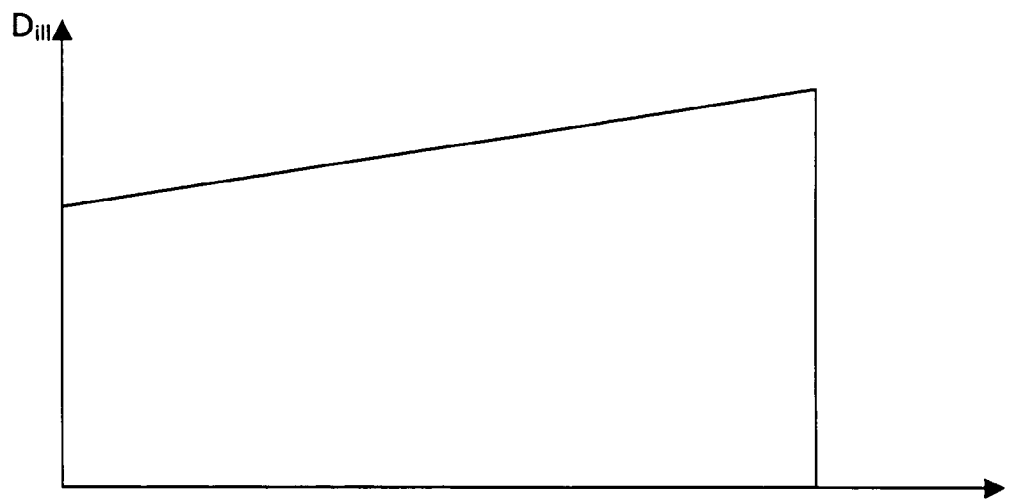
FIG. 5 represents the vertical distribution of light generated by the illumination system of FIG. 4.

FIG. 5 schematically represents the distribution of light $D_{ill}$ of the bundle of light $B_{ill}$ in the vertical direction generated by the illumination system just described, which is thus the distribution of light received by the imager 4. If the imager 4 is meant to display a uniform picture (for instance a white screen), FIG. 5 also corresponds to the distribution of light in the bundle $B_{img}$ output from the imager.

Figure 6:
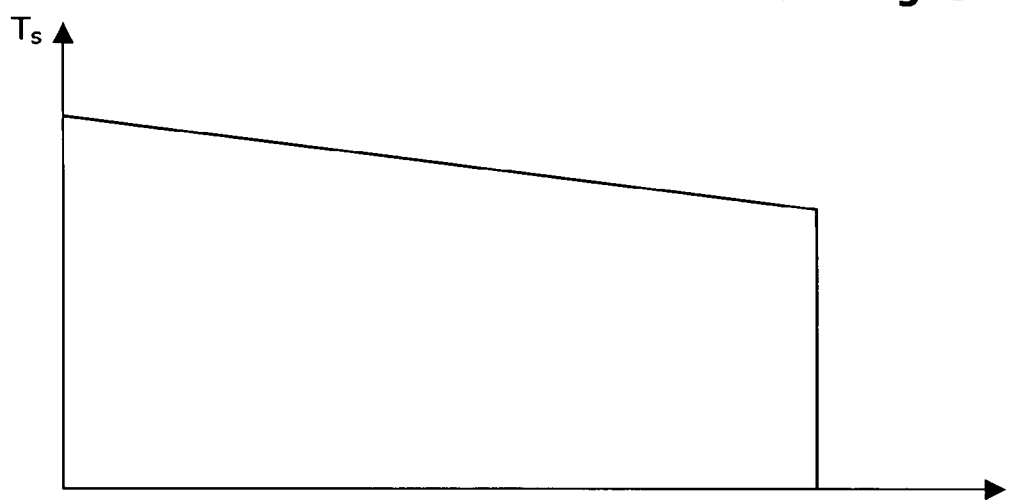
FIG. 6 represents the transmissivity $T_s$ of an imaging part of the apparatus of FIG. 1.

FIG. 6 schematically represents the transmissivity $T_s$ of the combined imaging system 6, 8 and viewing screen 10 along the vertical direction, which has a variation from bottom to top as explained above (due mainly to the desired small depth of the display apparatus).

Figure 7:
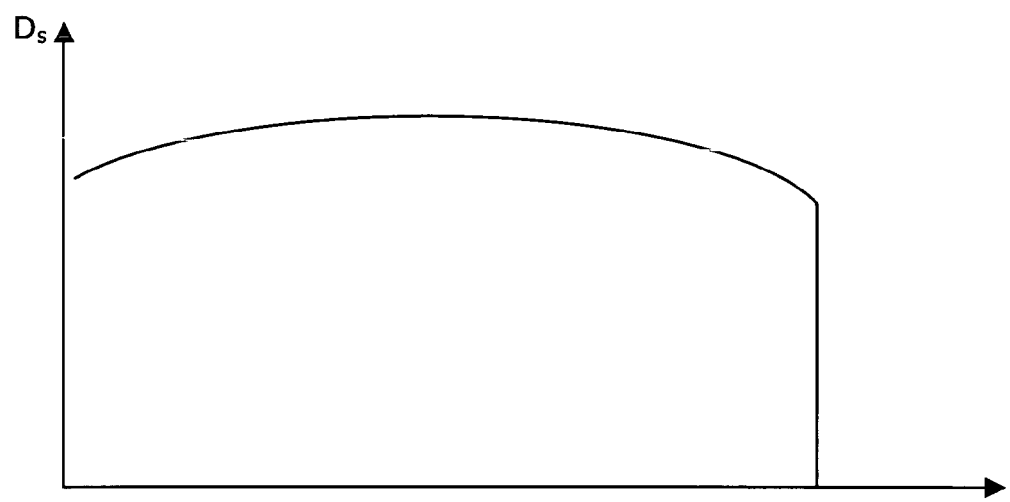
FIG. 7 represents the brightness level on a screen of the apparatus of FIG. 1.

FIG. 7 shows the brightness on the viewing screen 10 along the vertical direction, resulting from bundle $B_{img}$ (with distribution of FIG. 5) passing through the imaging system and transmissive elements of the viewing screen 10 (with efficiency of FIG. 6).

Clearly, the effect of the transmission variation over the screen 10 (which would have lead to a bottom with too much brightness without any specific provisions) is compensated by the asymmetrical distribution generated by the second light guide 20. The resulting distribution is substantially symmetrical over the vertical direction, with a peak brightness in the center, as preferable for the user.

Figure 8:
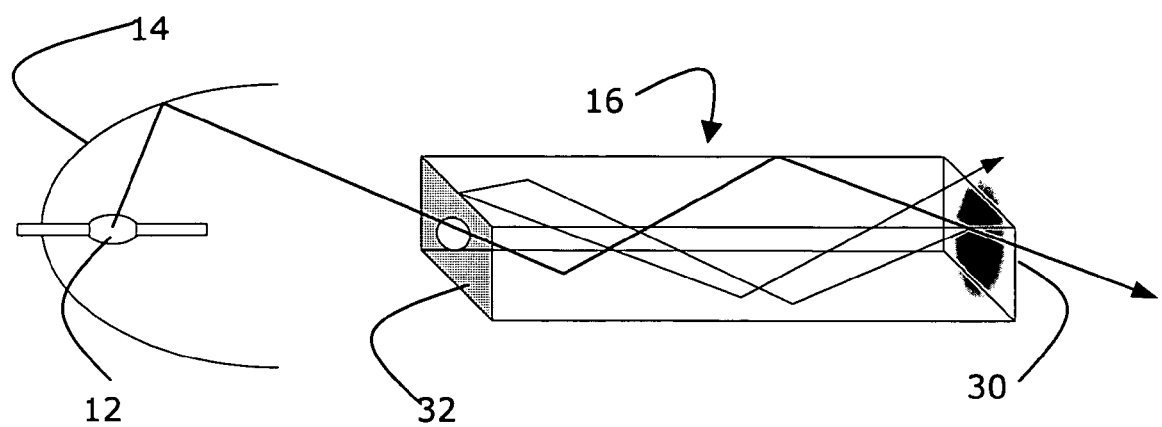
FIG. 8 represents another possible illumination system with a light tunnel.

A second possible embodiment of an illumination with means for controlling the distribution of light is shown on FIG. 8. References similar as those of FIGS. 2 to 4 will be used for elements of like nature.

The illumination system of FIG. 8 has a lamp realizing a light source 12 located at the focus of a reflector 14. The reflector 14 concentrates the light on an input face 32 of a light tunnel 16 having the form of a parallelepiped. Light is transmitted along the light tunnel 16 from the input face 32 to the output face 30, possibly with one or several internal reflections.

After exiting the light tunnel 16 from the output face 30, light is directed on an imager, as described in reference to FIG. 1, possibly through a conventional relay lens.

The output face 30 carries a reflective gradient coating, which acts as a gradient filter in order to control the distribution of light exiting from the light tunnel 16. The gradient coating is for instance realized by depositing aluminium.

Figure 9:
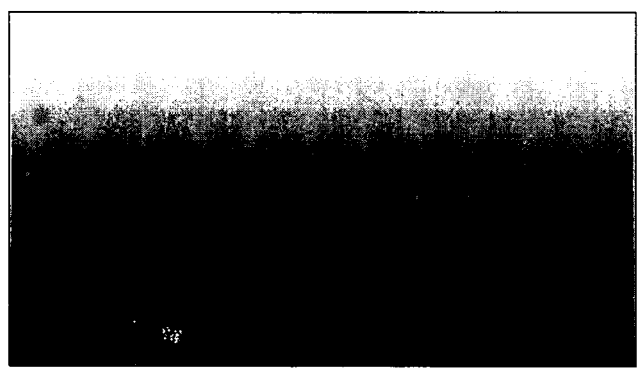
FIG. 9 represents a possible gradient filter for the exit face of the light tunnel of FIG. 8.
Figure 10:
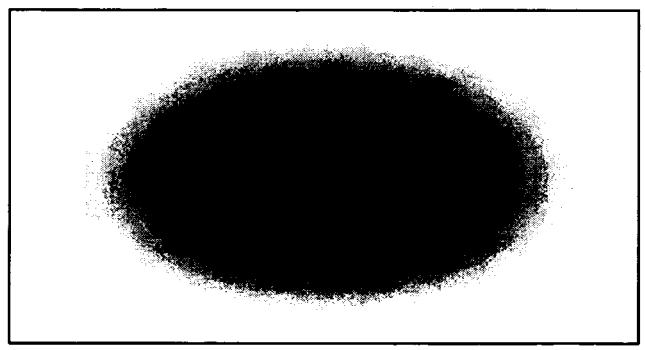
FIG. 10 represents another possible gradient filter for the exit face of the light tunnel of FIG. 8.

Exemplary gradient filters are represented on FIGS. 9 and 10.

The gradient filter of FIG. 9 allows for instance to compensate for an asymmetrical distribution of light in the imaging system, due e.g. to a wide range of incident angles on the screen 10. Explanations given with reference to FIGS. 5 to 7 also apply in this case.

The other example of a possible gradient filter given on FIG. 10 is a centered gradient (or center filter), particularly adapted for screen of very wide angle, onto which projection is realized on axis. In this case, the well-known corner phenomenon (lack of light in the corners) is pre-compensated by filtering light exiting in the center of the output face 30.

Of course, the gradient filter can be designed differently depending on the needs for control of the light distribution. It is thus apparent that the embodiment of FIG. 8 is a particularly flexible solution.

Further, a gradient filter with a compensating color can be used, notably to correct any possible color uniformity, for instance a magenta color shift as existing in some LCOS projection systems. This is another advantage of the present embodiment.

To minimize the losses, notably those due to the reflective gradient coating on the output face 30, the input face 32 has a mirror coating with a hole in the center corresponding to the intersection of the bundle of incoming light with the input face 32.

The above description is given as non-limitative possible embodiments of the invention. It can also be pointed out that the description mentions no reversal of the picture (for instance through the various lenses) to ease explanations but that the invention also applies when reversal of the picture occurs provided the light controlling means in the illumination system at least partially compensate on the viewing screen for variations in the transmissivity.

What is claimed is:

1. Display apparatus with an imager illuminated by an illumination system and with an imaging system projecting an image on a viewing screen, wherein the brightness of the image on the imager has a variation over a given direction, wherein the illumination system has a light guide controlling the light distribution over the given direction, the light guide generating a non-uniform light distribution over the given direction on the imager and compensating at least partially a variation of the brightness on the screen, and wherein the maximum projection angle of the image on the screen is greater than 50°.

2. Display apparatus according to claim 1, wherein, the given direction corresponds to the horizontal axis or the vertical axis of the image.

3. Display apparatus according to claim 1, wherein the light guide generates an asymmetrical light distribution over the given direction on the imager.

4. Display apparatus according to claim 1, wherein the light guide is asymmetrical relatively to an optical axis of the illumination system.

5. Display apparatus according to claim 1, wherein the light guide has the shape of a hexahedron.

6. Display apparatus according to claim 1, wherein the light guide has a rectangular section.

7. Display apparatus according to claim 1, wherein the light guide section is enlarging from the input to the output.

8. Display apparatus according to claim 1, wherein the light guide has an input face contacting another light guide.

9. Display apparatus according to claim 8, wherein said other light guide generates a substantially uniform light distribution over said input face.

10. Display apparatus according to claim 8, wherein the light guide has at least a face inclined relatively to a corresponding face of said other light guide.

11. Display apparatus according to claim 1, wherein the light guide has an output face, which is projected on the imager by a lens system.

12. Display apparatus with an imager illuminated by an illumination system and with an imaging system projecting an image on a viewing screen, wherein the brightness of the image on the imager has a variation over a given direction, wherein the illumination system has a light guide having an output face carrying a gradient filter controlling the light distribution over the given direction, the light guide fitted with the gradient filter generating a non-uniform light distribution over the given direction on the imager and compensating at least partially a variation of the brightness on the screen.

13. Display apparatus according to claim 12, wherein the gradient filter generates a non-uniform, preferably asymmetric, distribution of light exiting the output face.

14. Display apparatus according to claim 12, wherein the gradient filter is realized by a reflective gradient coating.

15. Display apparatus according to claim 12, wherein the gradient filter is colored.

16. Display apparatus according to claim 12, wherein the light guide has an input face carrying a reflective coating with a center hole.

* * * * *